(12) United States Patent
Oshita et al.

(10) Patent No.: US 12,319,285 B2
(45) Date of Patent: Jun. 3, 2025

(54) DRIVING ASSISTANCE DEVICE

(71) Applicant: Isuzu Motors Limited, Tokyo (JP)

(72) Inventors: Wasantha Oshita, Fujisawa (JP); Masaichi Takahashi, Fujisawa (JP); Shinichiro Fukazawa, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 170 days.

(21) Appl. No.: 17/801,324

(22) PCT Filed: Feb. 26, 2021

(86) PCT No.: PCT/JP2021/007277
§ 371 (c)(1),
(2) Date: Aug. 22, 2022

(87) PCT Pub. No.: WO2021/172496
PCT Pub. Date: Sep. 2, 2021

(65) Prior Publication Data
US 2023/0078907 A1 Mar. 16, 2023

(30) Foreign Application Priority Data
Feb. 28, 2020 (JP) .................. 2020-033773

(51) Int. Cl.
*B60W 30/00* (2006.01)
*B60W 30/16* (2020.01)

(52) U.S. Cl.
CPC ....... *B60W 30/16* (2013.01); *B60W 2554/802* (2020.02); *B60W 2554/804* (2020.02); *B60W 2720/106* (2013.01)

(58) Field of Classification Search
CPC .......... B60W 30/16; B60W 2554/804; B60W 2554/802; B60W 2720/106
USPC ......................................................... 701/96
See application file for complete search history.

(56) References Cited

U.S. PATENT DOCUMENTS

| | | |
|---|---|---|
| 2013/0030666 A1 | 1/2013 | Kato |
| 2013/0116909 A1 | 5/2013 | Shida |
| 2017/0072954 A1 | 3/2017 | Nemoto |
| 2018/0237011 A1* | 8/2018 | Laurent ................ B60W 30/16 |
| 2019/0184992 A1 | 6/2019 | Kanno |

(Continued)

FOREIGN PATENT DOCUMENTS

| | | |
|---|---|---|
| CN | 103038802 | 4/2013 |
| CN | 103687770 | 3/2014 |
| CN | 107054366 | 8/2017 |

(Continued)

*Primary Examiner* — Tiffany P Young
*Assistant Examiner* — Michael T Dowling

(57) ABSTRACT

Provided is a driving assistance device that makes it possible to smoothly accelerate from a stop or from a speed close to a stop. A target acceleration/deceleration output unit of the driving assistance device has: a first map that stores first target accelerations which are associated with inter-vehicle distance and with relative speed; a second map that stores second target accelerations which are associated with inter-vehicle distance and with relative speed and which are greater than the first target accelerations with respect to inter-vehicle distance and relative speed; and a selection unit that selects, according to a vehicle speed, whether to use the output of the first map and/or whether to use the output of the second map.

4 Claims, 4 Drawing Sheets

(56) References Cited

U.S. PATENT DOCUMENTS

2019/0391259 A1 12/2019 Shimizu et al.
2021/0276550 A1 9/2021 Gotou et al.

FOREIGN PATENT DOCUMENTS

| | | | |
|---|---|---|---|
| EP | 3650294 | 5/2020 | |
| JP | 07-017295 | 1/1995 | |
| JP | 11-20496 | 1/1999 | |
| JP | 2003-306053 | 10/2003 | |
| JP | 2003306053 A * | 10/2003 | |
| JP | 2009-001106 | 1/2009 | |
| JP | 2009-303342 | 12/2009 | |
| JP | 2009303342 A * | 12/2009 | ............ B60L 11/14 |
| JP | 2015-193327 | 11/2015 | |
| JP | 2019-018694 | 2/2019 | |
| JP | 2019-108836 | 7/2019 | |
| JP | 2019-167047 | 10/2019 | |
| JP | 2019-217936 | 12/2019 | |
| WO | WO 2019/008649 | 1/2019 | |

\* cited by examiner

DRIVING ASSISTANCE DEVICE

TECHNICAL FIELD

The present disclosure relates to a driving assistance apparatus of assisting the driving of a vehicle.

BACKGROUND ART

In recent years, as one technology of assisting the driving of a vehicle, adaptive cruise control (hereinafter referred to as "ACC") has been gathering attention (for example, see Patent Literature (hereinafter, referred to as PTL 1)). The ACC is a technology of obtaining the vehicle speed of a vehicle, the relative speed of a leading vehicle with respect to the vehicle, the inter-vehicle distance between the vehicle and the leading vehicle, and the like, and controlling a driving system and a braking system of the vehicle such that the vehicle speed and the inter-vehicle distance between the vehicle and the leading vehicle are maintained to be constant.

In the ACC, in general, cruise control (hereinafter referred to as "CC") that controls the speed of own car to be a set vehicle speed set in advance is performed when there are no leading cars.

CITATION LIST

Patent Literature

PTL 1
Japanese Patent Application Laid-Open No. HEI 7-17295

SUMMARY OF INVENTION

Technical Problem

In the ACC, a target acceleration/deceleration speed is obtained on the basis of the inter-vehicle distance and the relative speed with respect to the leading car, and a driving system and a braking system are controlled on the basis of the target acceleration/deceleration speed.

At the time of departure from vehicle-stoppage, for example, the torque necessary for acceleration becomes greater as compared to while traveling normally. In other words, the torque necessary for realizing the same acceleration speed is greater at the time of departure as compared to while traveling normally. Therefore, even when the same target acceleration speed is output from a target-acceleration/deceleration-speed output section of the ACC, the actual acceleration speed becomes smaller at the time of vehicle-stoppage or at a speed close to vehicle-stoppage as compared to while traveling normally. As a result, disadvantageously, acceleration cannot be performed with satisfactory responsiveness from vehicle-stoppage or a speed close to vehicle-stoppage occurs.

The present disclosure has been made in view of the abovementioned point and provides a driving assistance apparatus capable of achieving smooth acceleration from vehicle-stoppage or a speed close to vehicle-stoppage.

Solution to Problem

One aspect of a driving assistance apparatus of the present disclosure is an apparatus that assists driving of a vehicle, the driving assistance apparatus comprising:

an inter-vehicle-distance detection section that detects an inter-vehicle distance between own car and a leading car;
a relative-speed detection section that detects a relative speed between the own car and the leading car; and
a target-acceleration/deceleration-speed output section that outputs a target acceleration/deceleration speed of the own car on basis of the inter-vehicle distance and the relative speed, wherein the target-acceleration/deceleration-speed output section includes:
  a first map in which a first target acceleration speed associated with the inter-vehicle distance and the relative speed is stored;
  a second map in which a second target acceleration speed is stored, the second target acceleration speed being associated with the inter-vehicle distance and the relative speed and being greater than the first target acceleration speed regarding the inter-vehicle distance and the relative speed; and
  a selection section that selects whether to use an output of the first map or use an output of the second map in accordance with a speed of the own car.

Advantageous Effects of Invention

According to the present disclosure, it is possible to achieve smooth acceleration from vehicle-stoppage or a speed close to vehicle-stoppage.

DESCRIPTION OF EMBODIMENTS

One embodiment of the present invention is described in detail below with reference to the accompanying drawings.

<1> Configuration of Vehicle

First, the configuration of a vehicle including a driving assistance apparatus according to one embodiment of the present disclosure is described.

Figure 1:
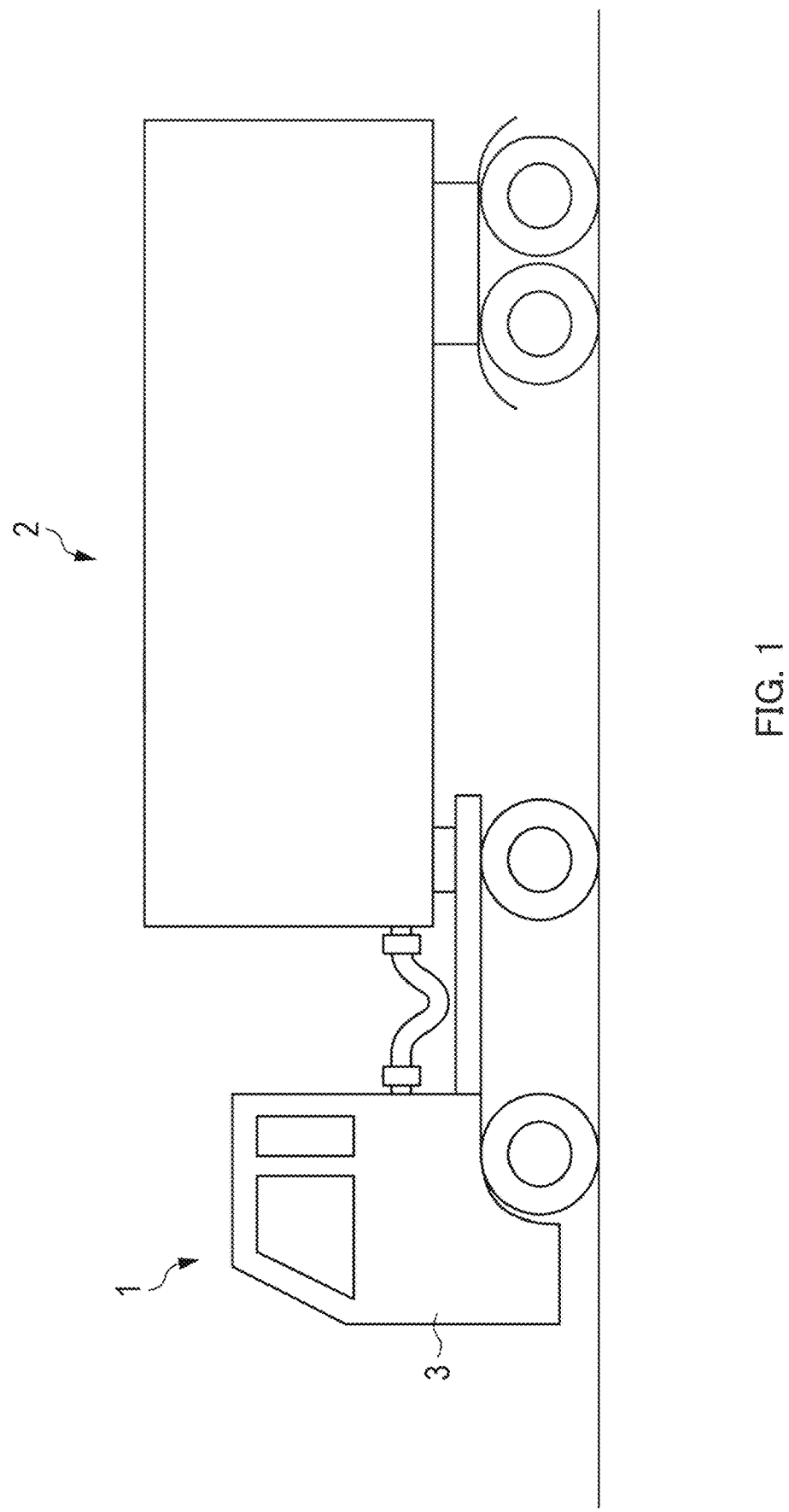
FIG. 1 is an external view illustrating an example of a vehicle to which a driving assistance apparatus according to an embodiment is applied.
Figure 2:
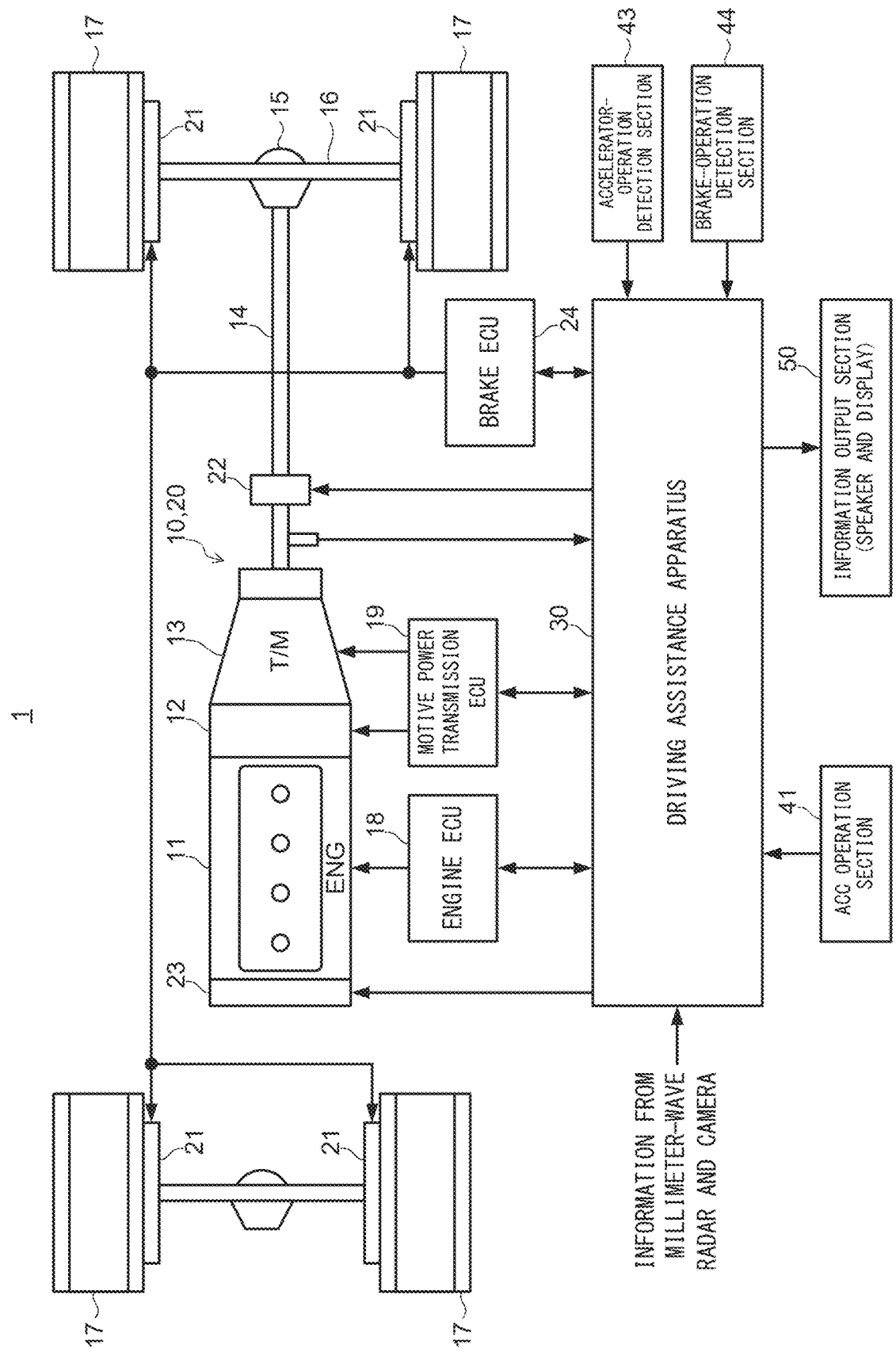
FIG. 2 is a block diagram illustrating the configuration of the vehicle of the embodiment.

FIG. 1 is an external view illustrating an example of vehicle 1 to which a driving assistance apparatus according to the present embodiment is applied. FIG. 2 is a block diagram illustrating the configuration of vehicle 1. Illustration and description are made by focusing on parts relating to the driving assistance apparatus.

As illustrated in FIG. 1, vehicle 1 is a tractor (traction vehicle) capable of towing trailer 2 as a result of coupling trailer 2 to the tractor. Vehicle 1 has vehicle main-body portion 3 including a power system such as an engine and driving wheels and a driver's seat, and trailer 2 coupled to vehicle main-body portion 3.

As illustrated in FIG. 2, vehicle 1 has driving system 10 that causes vehicle 1 to travel, braking system 20 that decelerates vehicle 1, driving assistance apparatus 30 that assists the driving of vehicle 1 by a driver, and the like.

Driving system 10 has engine 11, clutch 12, transmission 13, propeller shaft 14, differential gear 15, drive shaft 16, wheels 17, engine ECU 18, and motive power transmission ECU 19.

Engine ECU 18 and motive power transmission ECU 19 are connected to driving assistance apparatus 30 by an in-vehicle network such as a controller area network (CAN) and are able to transmit and receive necessary data and control signals to and from each other. Engine ECU 18 controls the output of engine 11 in accordance with a drive command from driving assistance apparatus 30. Motive power transmission ECU 19 controls the connection and disconnection of clutch 12 and the speed change of transmission 13 in accordance with a drive command from driving assistance apparatus 30.

The motive power of engine 11 is transmitted to transmission 13 via clutch 12. The motive power transmitted to transmission 13 is further transmitted to wheels 17 via propeller shaft 14, differential gear 15, and drive shaft 16. As a result, the motive power of engine 11 is transmitted to wheels 17, and vehicle 1 travels.

Braking system 20 has service brakes 21, auxiliary brakes 22, 23, a parking brake (not shown), and brake ECU 24.

Service brake 21 is a brake that is generally referred to as a main brake, a friction brake, a foot brake, a foundation brake, or the like. Service brake 21 is a drum brake that obtains braking force by pressing a brake lining against the inner side of a drum that rotates with wheel 17, for example.

Auxiliary brake 22 is a retarder (hereinafter referred to as "retarder 22") that obtains braking force by directly giving load to the rotation of propeller shaft 14, and is an electromagnetic retarder, for example. Auxiliary brake 23 is an exhaust brake (hereinafter referred to as "exhaust brake 23") that increases an effect of an engine brake with use of rotational resistance of the engine. By providing retarder 22 and exhaust brake 23, the braking force can be increased, and the frequency of usage of service brakes 21 is reduced. Therefore, the wear-out of brake lining and the like can be suppressed.

Brake ECU 24 is connected to driving assistance apparatus 30 by an in-vehicle network such as a CAN and is able to transmit and receive necessary data and control signals to and from each other. Brake ECU 24 controls the braking force of service brakes 21 (the brake fluid pressure of wheel cylinders of wheels 17) in accordance with a braking command from driving assistance apparatus 30.

The braking operation of service brakes 21 is controlled by driving assistance apparatus 30 and brake ECU 24. The braking operation of retarder 22 and exhaust brake 23 is controlled by on/off by driving assistance apparatus 30. The braking force of retarder 22 and exhaust brake 23 is substantially fixed. Therefore, when a desired braking force is to be accurately generated, service brakes 21 that can fine-adjust the braking force are suitable.

Information from a millimeter-wave radar and a camera is input to driving assistance apparatus 30. Information from the millimeter-wave radar and the camera is information indicating the traffic situation and the road situation ahead of the vehicle. Driving assistance apparatus 30 has ACC operation section 41, accelerator-operation detection section 43, brake-operation detection section 44, and the like.

Driving assistance apparatus 30 forms control signals for controlling the operation of driving system 10 and braking system 20. In particular, driving assistance apparatus 30 of the present embodiment obtains target acceleration/deceleration speed for realizing ACC and outputs the target acceleration/deceleration speed to engine ECU 18, motive power transmission ECU 19, and brake ECU 24, as appropriate.

Although not shown, each of engine ECU 18, motive power transmission ECU 19, brake ECU 24, and driving assistance apparatus 30 has a central processing unit (CPU), a storage medium such as a read only memory (ROM) in which a control program is stored, a working memory such as a random access memory (RAM), and a communication circuit, for example. In this case, for example, the functions of sections described below constituting driving assistance apparatus 30 are realized by executing control programs by the CPU. All or some of engine ECU 18, motive power transmission ECU 19, brake ECU 24, and driving assistance apparatus 30 may be integrated.

ACC operation section 41 includes an ACC ON/OFF switch for performing ON/OFF control of the operation of the ACC. ACC operation section 41 includes setting switches for setting various settings of the ACC. A driver can set a target inter-vehicle distance and a target own-vehicle speed, for example, by operating the setting switches. Those switches may be realized by a user interface displayed on a display with a touch screen.

Accelerator-operation detection section 43 detects the depression amount of an accelerator pedal and outputs the detection result to driving assistance apparatus 30. Driving assistance apparatus 30 transmits drive commands to engine ECU 18 and motive power transmission ECU 19 on the basis of the depression amount of the accelerator pedal.

Brake-operation detection section 44 detects the depression amount of a brake pedal for operating service brakes 21. Brake-operation detection section 44 detects whether an auxiliary brake lever that causes retarder 22 or exhaust brake 23 to operate has been operated. Brake-operation detection section 44 outputs the detection result relating to the brake pedal and the auxiliary brake lever to driving assistance apparatus 30. Driving assistance apparatus 30 transmits a braking command to brake ECU 24 on the basis of the depression amount of the brake pedal. Driving assistance apparatus 30 controls the ON/OFF operation of retarder 22 or exhaust brake 23 on the basis of the operation of the auxiliary brake lever.

Driving assistance apparatus 30 outputs various information relating to traveling from information output section 50. For example, information output section 50 outputs that sound and display, to thereby indicate that the ACC is being executed or the ACC is being stopped.

<2> Configuration and Operation of Driving Assistance Apparatus

Figure 3:
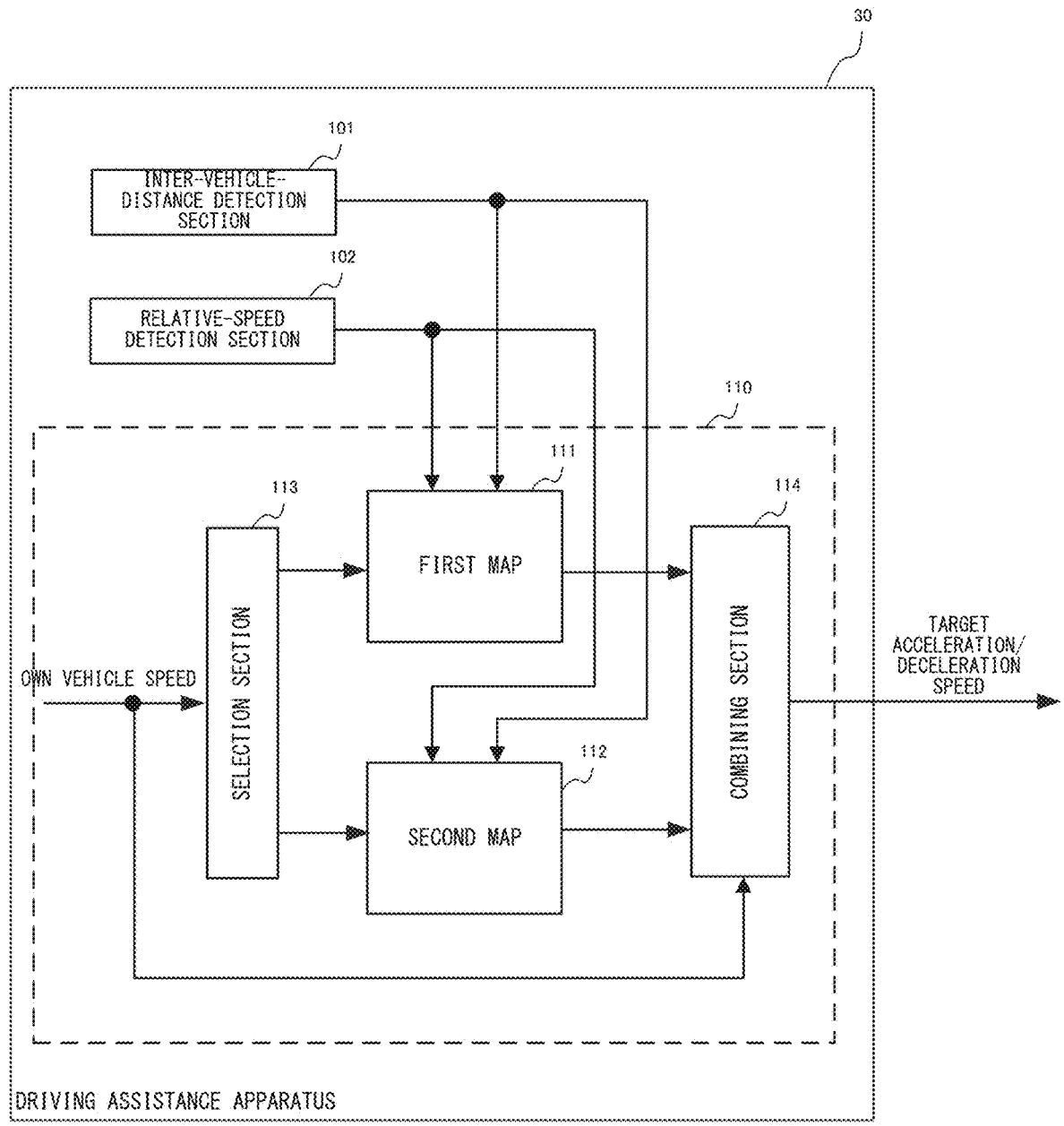
FIG. 3 is a block diagram illustrating the configuration of the driving assistance apparatus.

FIG. 3 is a block diagram illustrating the configuration of driving assistance apparatus 30 of the present embodiment.

Driving assistance apparatus 30 has inter-vehicle-distance detection section 101, relative-speed detection section 102, and target-acceleration/deceleration-speed output section 110.

Inter-vehicle-distance detection section 101 and relative-speed detection section 102 respectively measure (detect) the inter-vehicle distance and the relative speed between own vehicle 1 and a leading car on the basis of information obtained by the millimeter-wave radar, the camera, and the like, and output the measurement results to target-acceleration/deceleration-speed output section 110. Inter-vehicle-distance detection section 101 and relative-speed detection section 102 may measure inter-vehicle distance and the relative speed on the basis of information from other sensors such as a laser radar.

Target-acceleration/deceleration-speed output section 110 outputs the target acceleration/deceleration speed for causing own car to follow the leading car on the basis of the inter-vehicle distance and the relative speed between the own car and the leading car. As a result, automatic following traveling control is realized. When there are no leading cars, target-acceleration/deceleration-speed output section 110 outputs a target acceleration speed for causing the speed of the own car to be a set certain speed. As a result, constant-speed traveling control is realized.

Automatic-following traveling control is control that operates driving system 10 and braking system 20 such that the inter-vehicle distance is within a predetermined target range and the relative speed approaches zero when a leading vehicle is present in a predetermined range. The constant-speed traveling control is control that operates driving system 10 and braking system 20 such that the traveling speed of vehicle 1 approaches a predetermined target value when there are no leading vehicles in a predetermined range.

Target-acceleration/deceleration-speed output section 110 of the present embodiment has first map 111, second map 112, selection section 113, and combining section 114.

In first map 111, a first target acceleration speed associated with the inter-vehicle distance and the relative speed is stored. Actually, in first map 111, a first target deceleration speed is also stored in addition to the first target acceleration speed. The inter-vehicle distance and the relative speed are input, and a first target acceleration/deceleration speed in accordance with the inter-vehicle distance and the relative speed is output.

In second map 112, a second target acceleration speed is stored, which is associated with the inter-vehicle distance and the relative speed and is greater than the first target acceleration speed regarding the inter-vehicle distance and the relative speed. Actually, in second map 112, a second target deceleration speed is also stored in addition to the second target acceleration speed. The inter-vehicle distance and the relative speed are input, and a second target acceleration/deceleration speed in accordance with the inter-vehicle distance and the relative speed is output.

The first target deceleration speed stored in first map 111 and the second target deceleration speed stored in second map 112 may be same values or different values regarding the inter-vehicle distance and the relative speed.

Selection section 113 selects whether to use the output of first map 111 or use output of the second map 112 in accordance with the own vehicle speed.

Combining section 114 combines the output of first map 111 and the output of second map 112.

Figure 4:
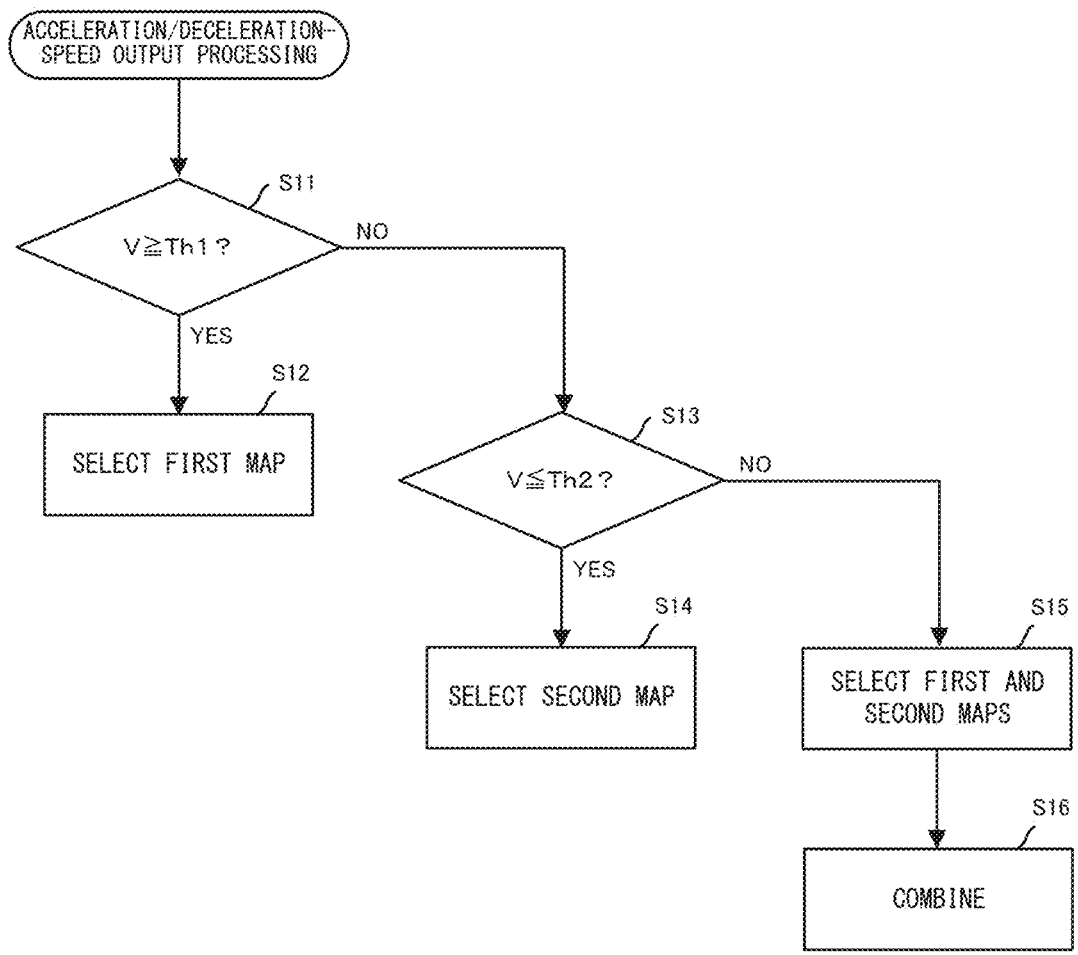
FIG. 4 is a flowchart illustrating acceleration/deceleration-speed output processing of the driving assistance apparatus.

FIG. 4 is a flowchart illustrating acceleration/deceleration-speed output processing of target-acceleration/deceleration-speed output section 110.

In Step S11, it is determined by selection section 113 whether own vehicle speed V is equal to or more than first threshold value Th1. When own vehicle speed V is equal to or more than first threshold value Th1, transition is made to Step S12, and first map 111 is selected by selection section 113. As a result, a target acceleration/deceleration speed in accordance with the inter-vehicle distance and the relative speed is output from first map 111.

Meanwhile, in Step S11, when own vehicle speed V is less than first threshold value Th1, transition is made to Step S13.

In Step S13, it is determined by selection section 113 whether own vehicle speed V is equal to or less than second threshold value Th2. When own vehicle speed V is equal to or less than second threshold value Th2, transition is made to Step S14, and second map 112 is selected by selection section 113. As a result, a target acceleration/deceleration speed in accordance with the inter-vehicle distance and the relative speed is output from second map 112.

First threshold value Th1 and second threshold value Th2 are in a relationship of Th1>Th2.

Meanwhile, in Step S13, when it is determined by selection section 113 that own vehicle speed V is greater than second threshold value Th2, transition is made to Step S15.

In Step S15, both of first map 111 and second map 112 are selected by selection section 113, and target acceleration/deceleration speeds in accordance with the inter-vehicle distance and the relative speed are output from first and second maps 111, 112. In following Step S16, the target acceleration/deceleration speed output from first map 111 and the target acceleration/deceleration speed output from second map 112 are combined by combining section 114.

By performing the processing in FIG. 4, target-acceleration/deceleration-speed output section 110 outputs the target acceleration/deceleration speed from first map 111 when $V \geq Th1$ is satisfied, outputs the target acceleration/deceleration speed from second map 112 when $V \leq Th2$ is satisfied, and outputs the target acceleration/deceleration speed obtained by combining the target acceleration/deceleration speed output from first map 111 and the target acceleration/deceleration speed output from second map 112 when $Th2 < V < Th1$ is satisfied.

As a result, target-acceleration/deceleration-speed output section 110 of the present embodiment outputs different target acceleration/deceleration speeds (target acceleration speeds that are actually different) in accordance with the own vehicle speed even when the same inter-vehicle distance and relative speed are input.

For example, when first threshold value Th1 is set to 30 km/h and second threshold value is set to 20 km/h, the target acceleration/deceleration speed of second map 112 is used at vehicle-stoppage or in a speed range of 20 km/h that is a speed close to vehicle-stoppage or less, the target acceleration/deceleration speed of first map 111 is used in a speed range of 30 km/h or more, and the target acceleration/deceleration speed obtained by combining the target acceleration/deceleration speeds of first map 111 and second map 112 is used in a speed range between the two.

In second map 112 used at vehicle-stoppage or in a speed range close to vehicle-stoppage, a target acceleration speed of which value is greater than that of first map 111 regarding the same inter-vehicle distance and relative speed is stored. As a result, a target acceleration speed of which value is greater is output when own vehicle 1 is being stopped or at a speed close to being stopped as compared to when own vehicle 1 is traveling at a speed greater than the above even when the same inter-vehicle distance and relative speed are input.

In the present embodiment, in short, it can be said that the torque insufficiency when acceleration is performed from vehicle-stoppage or a speed close to vehicle-stoppage is compensated by causing the target acceleration/deceleration speed to be greater.

By performing the combining processing as that in Step S15 and Step S16, a rapid change in the target acceleration/deceleration speed at the time of switching between first map 111 and second map 112 can be suppressed.

Combining section 114 is preferred to combine the outputs of first and second maps 111, 112 by performing weighting addition of the outputs of first and second maps 111, 112 on the basis of the own vehicle speed, for example. In other words, weighting addition only needs to be performed by multiplying the target acceleration/deceleration speed of first map 111 by a large weighting factor when the own vehicle speed is close to first threshold value Th1 (30 km/h), and weighting addition only needs to be performed by multiplying the target acceleration/deceleration speed of second map 112 by a large weighting factor when the own vehicle speed is close to second threshold value Th2 (20 km/h).

The configurations of first and second maps 111, 112 can be conceived to be realized by one map. However, the map for outputting the target acceleration/deceleration speed is a three-dimensional map that outputs the target acceleration/deceleration speed in accordance with the inter-vehicle distance and the relative speed in the first place. Therefore, when the target acceleration/deceleration speed is to be changed in accordance with the own vehicle speed, a four-dimensional map needs to be generated, and realization is difficult.

The configuration of the present embodiment can change the target acceleration/deceleration speed (target acceleration speed) in accordance with the inter-vehicle distance, the relative speed, and the own vehicle speed by a simple configuration.

<3> Effects of Embodiment

As described above, according to the present embodiment, target-acceleration/deceleration-speed output section 110 includes: first map 111 in which the first target acceleration speed associated with the inter-vehicle distance and the relative speed is stored; second map 112 in which the second target acceleration speed is stored, which is associated with the inter-vehicle distance and the relative speed and is greater than the first target acceleration speed regarding the inter-vehicle distance and the relative speed; and selection section 113 that selects whether to use the output of first map 111 or use the output of second map 112 in accordance with the speed of the own car.

As a result, the torque insufficiency when acceleration is performed from vehicle-stoppage or a speed close to vehicle-stoppage can be compensated by causing the target acceleration/deceleration speed to be greater. Therefore, driving assistance apparatus 30 capable of achieving smooth acceleration from vehicle-stoppage or a speed close to vehicle-stoppage can be realized.

Driving assistance apparatus 30 of the present embodiment is particularly effective for a vehicle having a driving system that needs a greater torque when accelerating from vehicle-stoppage or a speed close to vehicle-stoppage as compared to when accelerating from a speed at the time of normal traveling.

The abovementioned embodiment is merely an example of a realization for carrying out the present invention, and the interpretation of the technical scope of the present invention is not to be limited by those embodiments. In other words, the present invention can be carried out in various forms without departing from the gist or the main features of the present invention.

In the present embodiment, a case where vehicle 1 to which the driving assistance apparatus of the present invention is applied is a tractor capable of towing trailer 2 as a result of coupling trailer 2 to the tractor is described. However, the vehicle to which the present invention is applicable is not limited thereto and may be a vehicle such as a passenger car.

The present application is based on Japanese Patent Application (Japanese Patent Application No. 2020-33773) filed on Feb. 28, 2020, the entire content of which is incorporated herein by reference.

INDUSTRIAL APPLICABILITY

The driving assistance apparatus of the present embodiment is suitable use for a vehicle having a driving system that needs a greater torque when accelerating from vehicle-stoppage or a speed close to vehicle-stoppage as compared to when accelerating from a speed at the time of normal traveling.

REFERENCE SIGNS LIST

1 Vehicle
2 Trailer
3 Vehicle main-body portion
10 Driving system
11 Engine
12 Clutch
13 Transmission
14 Propeller shaft
15 Differential gear
16 Drive shaft
17 Wheel
18 Engine ECU
19 Motive power transmission ECU
20 Braking system
21 Service brake
22 Retarder
23 Exhaust brake
24 Brake ECU
30 Driving assistance apparatus
101 Inter-vehicle-distance detection section
102 Relative-speed detection section
110 Target-acceleration/deceleration-speed output section
111 First map
112 Second map
113 Selection section
114 Combining section

The invention claimed is:

1. A driving assistance apparatus for controlling operations of a driving system and a braking system of an own car, the driving assistance apparatus comprising a processor configured to:
acquire an inter-car distance between the own car and a leading car;
acquire a relative speed between the own car and the leading car; and
output a target acceleration or a target deceleration value of the own car on basis of the inter-car distance and the relative speed, wherein
the processor includes:
a first map in which a first target acceleration value associated with the inter-car distance and the relative speed is stored; and
a second map in which a second target acceleration value is stored, the second target acceleration value being associated with the inter-car distance and the relative speed and being greater than the first target acceleration value; and
the processor is configured to:
select whether to use the first map or use the second map or use the second map in accordance with an own car speed, select the second map when the own car speed is less than a threshold speed, and output the second target acceleration value of the own car based on the second map so as to perform adaptive cruise control of the own car.

2. The driving assistance apparatus according to claim 1, wherein the processor is configured to select at least the first map when the own car speed is equal to or more than a first threshold value and select at least the second map when the own car speed is equal to or less than the first threshold value.

3. The driving assistance apparatus according to claim 1, wherein the processor is configured to:
- select the first map when the own car speed is equal to or more than a first threshold value;
- select the second map when the own car speed is equal to or less than a second threshold value less than the first threshold value;
- select the first map and the second map when the own car speed is less than the first threshold value and greater than the second threshold value; and
- combine the first map and the second map when the own car speed is less than the first threshold value and greater than the second threshold value, wherein,
- the first threshold value is greater than the second threshold value.

4. The driving assistance apparatus according to claim 3, wherein the processor is configured to combine the first map and the second map by performing weighting addition of the output of the first map and the output of the second map on basis of the own car speed.

* * * * *